US009614653B2

(12) United States Patent
Kim et al.

(10) Patent No.: US 9,614,653 B2
(45) Date of Patent: Apr. 4, 2017

(54) METHOD AND APPARATUS FOR PERFORMING QUASI CO-LOCATION IN WIRELESS ACCESS SYSTEM

(71) Applicant: LG ELECTRONICS INC., Seoul (KR)

(72) Inventors: Bonghoe Kim, Seoul (KR); Yunjung Yi, Seoul (KR); Suckchel Yang, Seoul (KR); Joonkui Ahn, Seoul (KR); Dongyoun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/655,671

(22) PCT Filed: Jan. 20, 2014

(86) PCT No.: PCT/KR2014/000555
§ 371 (c)(1),
(2) Date: Jun. 25, 2015

(87) PCT Pub. No.: WO2014/112841
PCT Pub. Date: Jul. 24, 2014

(65) Prior Publication Data
US 2015/0349940 A1      Dec. 3, 2015

Related U.S. Application Data

(60) Provisional application No. 61/753,943, filed on Jan. 18, 2013, provisional application No. 61/862,984, (Continued)

(51) Int. Cl.
*H04L 5/00* (2006.01)
*H04L 27/26* (2006.01)
*H04J 11/00* (2006.01)

(52) U.S. Cl.
CPC .............. *H04L 5/005* (2013.01); *H04J 11/00* (2013.01); *H04J 11/0053* (2013.01);
(Continued)

(58) Field of Classification Search
None
See application file for complete search history.

(56) References Cited

U.S. PATENT DOCUMENTS

| 2014/0119266 A1* | 5/2014 | Ng | H04L 1/0061 |
| | | | 370/312 |
| 2014/0126490 A1* | 5/2014 | Chen | H04L 5/0048 |
| | | | 370/329 |

(Continued)

OTHER PUBLICATIONS

PCT International Application No. PCT/KR2014/000555, Written Opinion of the International Searching Authority dated Apr. 25, 2014, 21 pages.

(Continued)

*Primary Examiner* — Diane Lo
(74) *Attorney, Agent, or Firm* — Lee Hong Degerman Kang Waimey

(57) ABSTRACT

The present invention relates to various methods for performing quasi co-location (QCL) and apparatuses supporting the same. As an embodiment of the present invention, a method for performing quasi co-location (QCL) for a new carrier type (NCT) by a terminal in a wireless access system may include the steps of: receiving a higher layer signal including a QCL reference CRS information parameter indicating CRS information of a reference carrier; receiving a physical downlink control channel (PDCCH) signal including a PDSCH remapping and quasi co-location indicator (PQI) field; receiving a CSI-RS of a QCLed NCT and a CRS of a reference carrier on the basis of a PQI field and a QCL reference CRS information parameter; and perform- (Continued)

ing frequency tracking of the NCT and the reference carrier on the basis of the CSI-RS of the NCT and the CRS of the reference carrier.

8 Claims, 12 Drawing Sheets

Related U.S. Application Data filed on Aug. 7, 2013, provisional application No. 61/863,429, filed on Aug. 8, 2013.

(52) U.S. Cl.
CPC .......... *H04L 5/0023* (2013.01); *H04L 5/0094* (2013.01); *H04L 27/2657* (2013.01); *H04L 27/2675* (2013.01); *H04L 5/001* (2013.01)

(56) References Cited

U.S. PATENT DOCUMENTS

2015/0341882 A1* 11/2015 Davydov .............. H04L 5/0057 370/336

2015/0349855 A1* 12/2015 Sesia ...................... H04B 7/024 370/252

OTHER PUBLICATIONS

MediaTek Inc., et al., "Remaining signaling issues of DCI format 2D," 3GPP TSG RAN WG1 Meeting #71, R1-124936, Nov. 2012, 3 pages.
Huawei, et al., "Quasi co-location aspects between CRS, CSI-RS and DMRS for frequency synchronization," 3GPP TSG RAN WG1 Meeting #71, R1-124689, Nov. 2012, 4 pages.
LG Electronics, "Signaling for CRS-to-CSI-RS quasi co-location assumptions," 3GPP TSG RAN WG1 Meeting #71, R1-124974, Nov. 2012, 4 pages.
Renesas Mobile Europe Ltd, "Quasi-colocation between CRS and CSI-RS antenna ports," 3GPP TSG-RAN WG1 Meeting #71, R1-125048, Nov. 2012, 4 pages.
Nokia Siemens Networks, et al., "Signaling quasi co-location between CRS and CSI-RS," 3GPP TSG RAN WG1 Meeting #71, R1-125257, Nov. 2012, 7 pages.
PCT International Application No. PCT/KR2014/000555, Written Opinion of the International Searching Authority dated Apr. 25, 2014, 15 pages.

* cited by examiner

METHOD AND APPARATUS FOR PERFORMING QUASI CO-LOCATION IN WIRELESS ACCESS SYSTEM

CROSS-REFERENCE TO RELATED APPLICATIONS

This application is the National Stage filing under 35 U.S.C. 371 of International Application No. PCT/KR2014/000555, filed on Jan. 20, 2014, which claims the benefit of U.S. Provisional Application No. 61/753,943, filed on Jan. 18, 2013, 61/862,984, filed on Aug. 7, 2013 and 61/863,429, filed on Aug. 8, 2013, the contents of which are all hereby incorporated by reference herein in their entirety.

TECHNICAL FIELD

The present invention relates to a wireless access system and, more particularly, to methods for performing Quasi Co-Location (QCL) and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide an efficient data transmission method.

Another object of the present invention is to provide methods and apparatuses for performing QCL.

Another object of the present invention is to provide methods for performing frequency tracking using a tracking reference signal in a new carrier type.

Another object of the present invention is to provide methods for QCL between transmission points in a CoMP environment.

Another object of the present invention is to provide apparatuses for supporting the above methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides methods for performing QCL and apparatuses for supporting the same.

In an aspect of the present invention, a method for performing Quasi Co-Location (QCL) for a New Carrier Type (NCT) by a User Equipment (UE) in a wireless access system is provided. The method may include receiving a higher layer signal including a QCL reference Cell specific Reference Signal (CRS) information parameter indicating CRS information of a reference carrier, receiving a Physical Downlink Control Channel (PDCCH) signal including a Physical Downlink Shared Channel (PDSCH) Resource Element (RE) Mapping and QCL Indicator (PQI) field, receiving a Channel State Information Reference Signal (CSI-RS) of the NCT with which a CRS of the reference carrier is QCL, based on the QCL reference CRS information parameter and the PQI field, and performing frequency tracking of the reference carrier and the NCT based on the CRS of the reference carrier and the CSI-RS of the NCT.

In another aspect of the present invention, an apparatus supporting performing Quasi Co-Location (QCL) for a New Carrier Type (NCT) in a wireless access system is provided. The apparatus may include a receiver and a processor for supporting QCL. The processor may be configured to receive a higher layer signal including a QCL reference Cell specific Reference Signal (CRS) information parameter indicating CRS information of a reference carrier through the receiver, receive a Physical Downlink Control Channel (PDCCH) signal including a Physical Downlink Shared Channel (PDSCH) Resource Element (RE) Mapping and QCL Indicator (PQI) field through the receiver, receive a Channel State Information Reference Signal (CSI-RS) of the NCT carrier with which a CRS of the reference carrier is QCL through the receiver, based on the QCL reference CRS information parameter and the PQI field, and perform frequency tracking of the reference carrier and the NCT based on the CRS of the reference carrier and the CSI-RS of the NCT.

The UE may be configured as transmission mode 10 and QCL type B, and the QCL type B may indicate that an antenna port for a Tracking Reference Signal (TRS) associated with a QCL CRS information parameter corresponding to a Channel State Information Reference Signal (CSI-RS) resource configuration and an antenna port corresponding to the CSI-RS resource configuration are QCL.

The UE may be configured as transmission mode 10 and QCL type B and assume that an antenna port of the reference carrier associated with a QCL reference CRS information field corresponding to a CSI-RS resource configuration and an antenna port corresponding to an RS configuration of the first carrier are QCL with respect to Doppler shift and Doppler spread.

The PQI field may indicate a parameter set for QCL configured for the UE.

The higher layer signal may further include a reference carrier indication parameter indicating the reference carrier, and the reference carrier is a Primary cell (Pcell).

The afore-described aspects of the present disclosure are merely a part of embodiments of the present disclosure. Those skilled in the art will derive and understand various embodiments reflecting the technical features of the present disclosure from the following detailed description of the present disclosure.

Advantageous Effects

According to the embodiments of the present disclosure, the following effects can be achieved.

First, data can be efficiently transmitted and received by using a new carrier type.

Second, QCL performance can be improved in a new carrier type and a CoMP environment.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
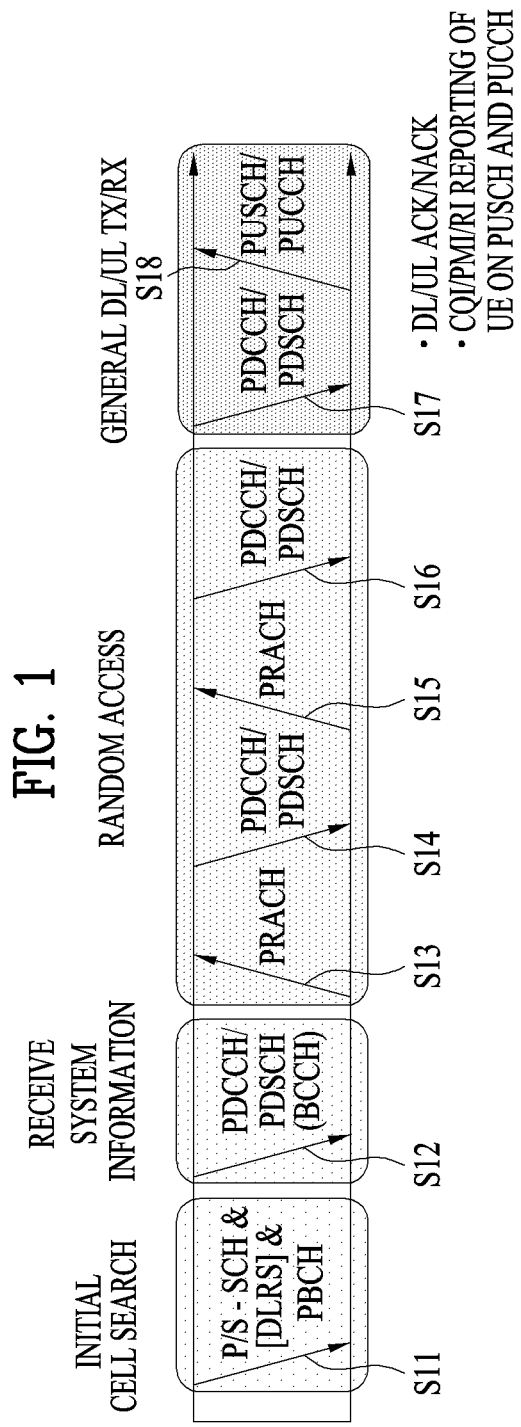
FIG. 1 illustrates physical channels and a general signal transmission method using the physical channels, which may be used in embodiments of the present disclosure.

The present disclosure provides methods for performing Quasi Co-Location (QCL) and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure. In addition, all of the terms disclosed by the present description can be explained based on the standard specification documents.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
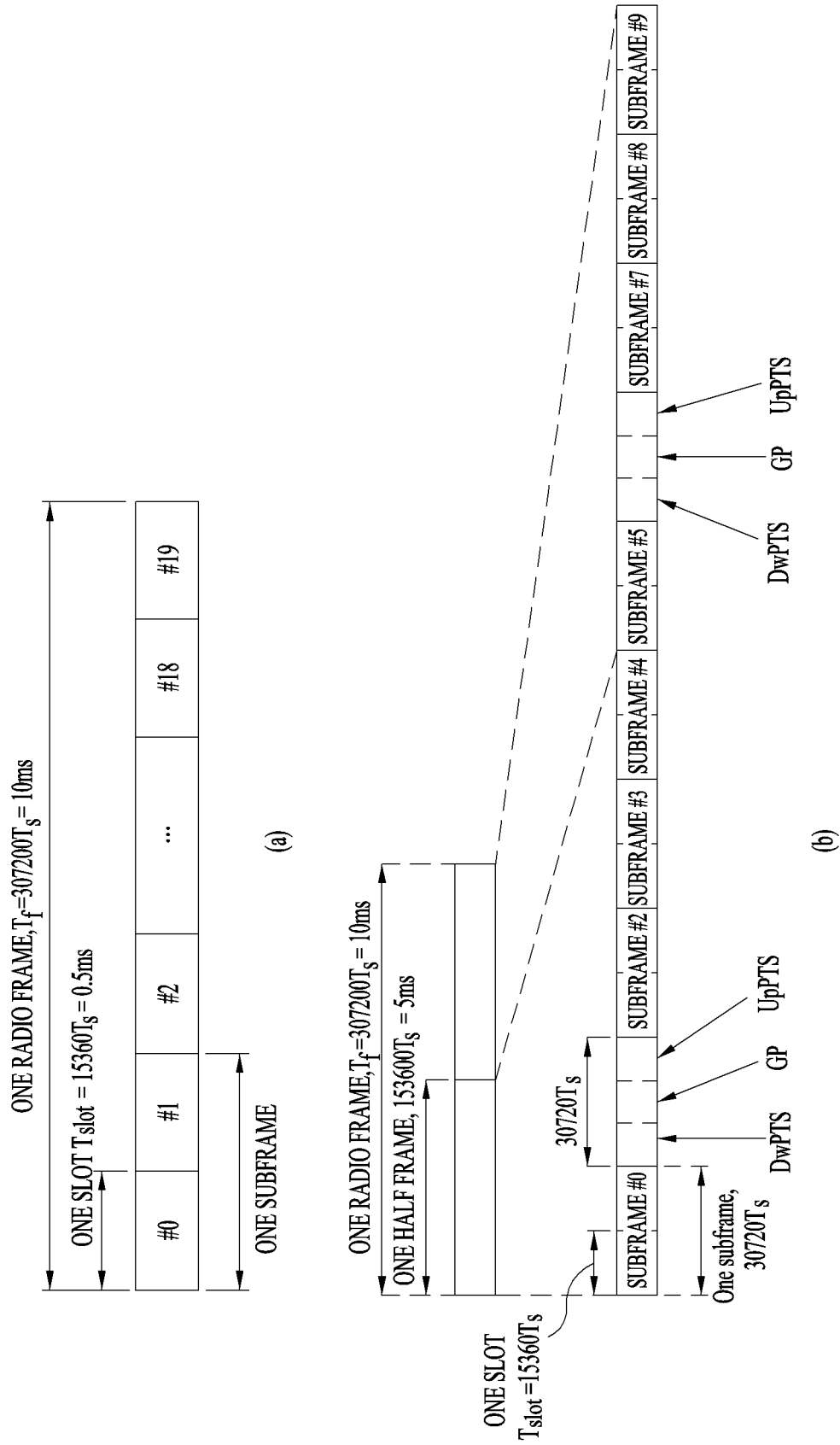
FIG. 2 illustrates radio frame structures used in embodiments of the present disclosure.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$  | $2192 \cdot T_s$ | $2560 \cdot T_s$ | $7680 \cdot T_s$  | $2192 \cdot T_s$ | $2560 \cdot T_s$ |
| 1 | $19760 \cdot T_s$ |                  |                  | $20480 \cdot T_s$ |                  |                  |
| 2 | $21952 \cdot T_s$ |                  |                  | $23040 \cdot T_s$ |                  |                  |
| 3 | $24144 \cdot T_s$ |                  |                  | $25600 \cdot T_s$ |                  |                  |
| 4 | $26336 \cdot T_s$ |                  |                  | $7680 \cdot T_s$  |                  |                  |
| 5 | $6592 \cdot T_s$  | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ |                  |                  | $23040 \cdot T_s$ |                  |                  |
| 7 | $21952 \cdot T_s$ |                  |                  | —                 | —                | —                |
| 8 | $24144 \cdot T_s$ |                  |                  | —                 | —                | —                |

Figure 3:
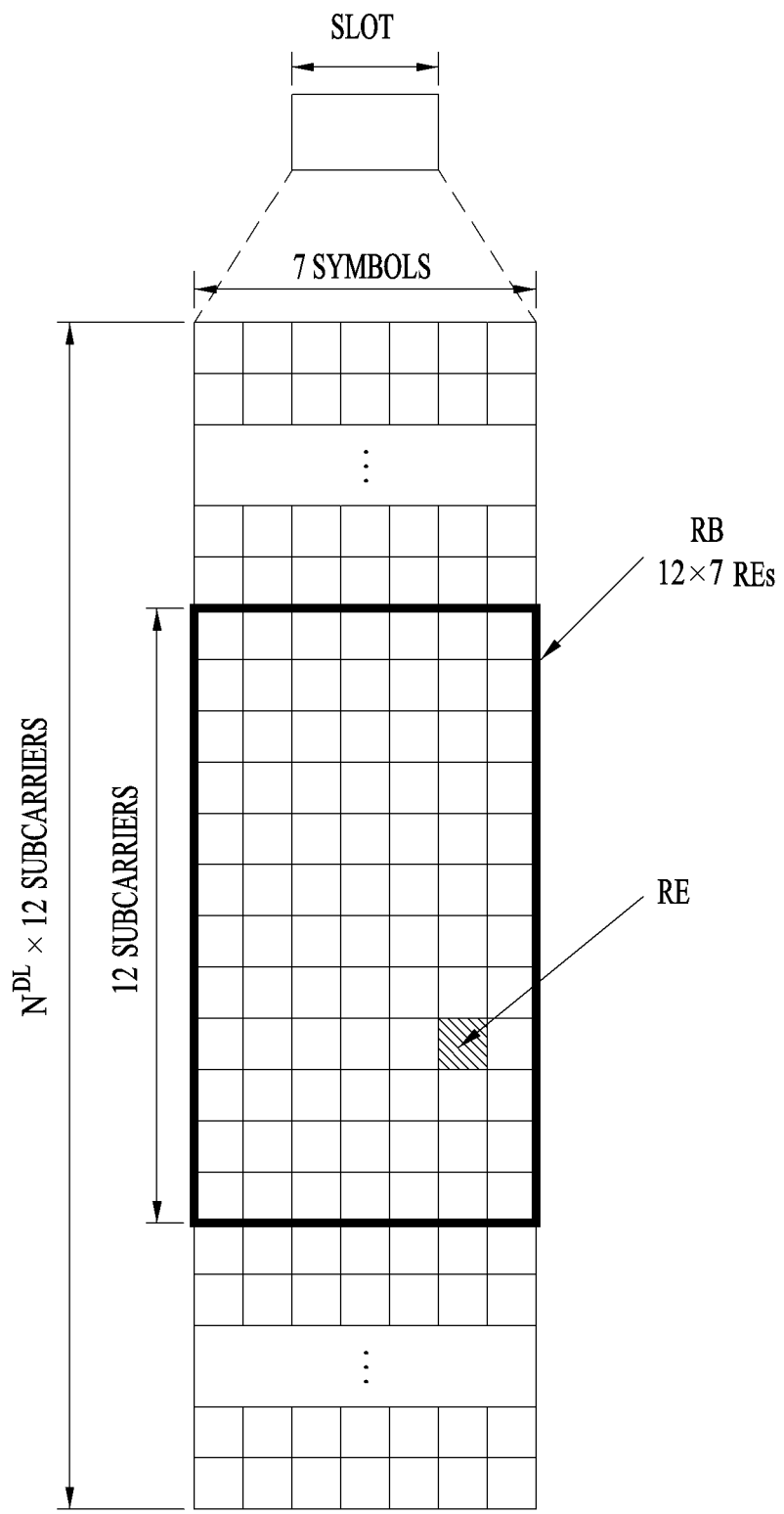
FIG. 3 illustrates a structure of a DownLink (DL) resource grid for the duration of one DL slot, which may be used in embodiments of the present disclosure.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
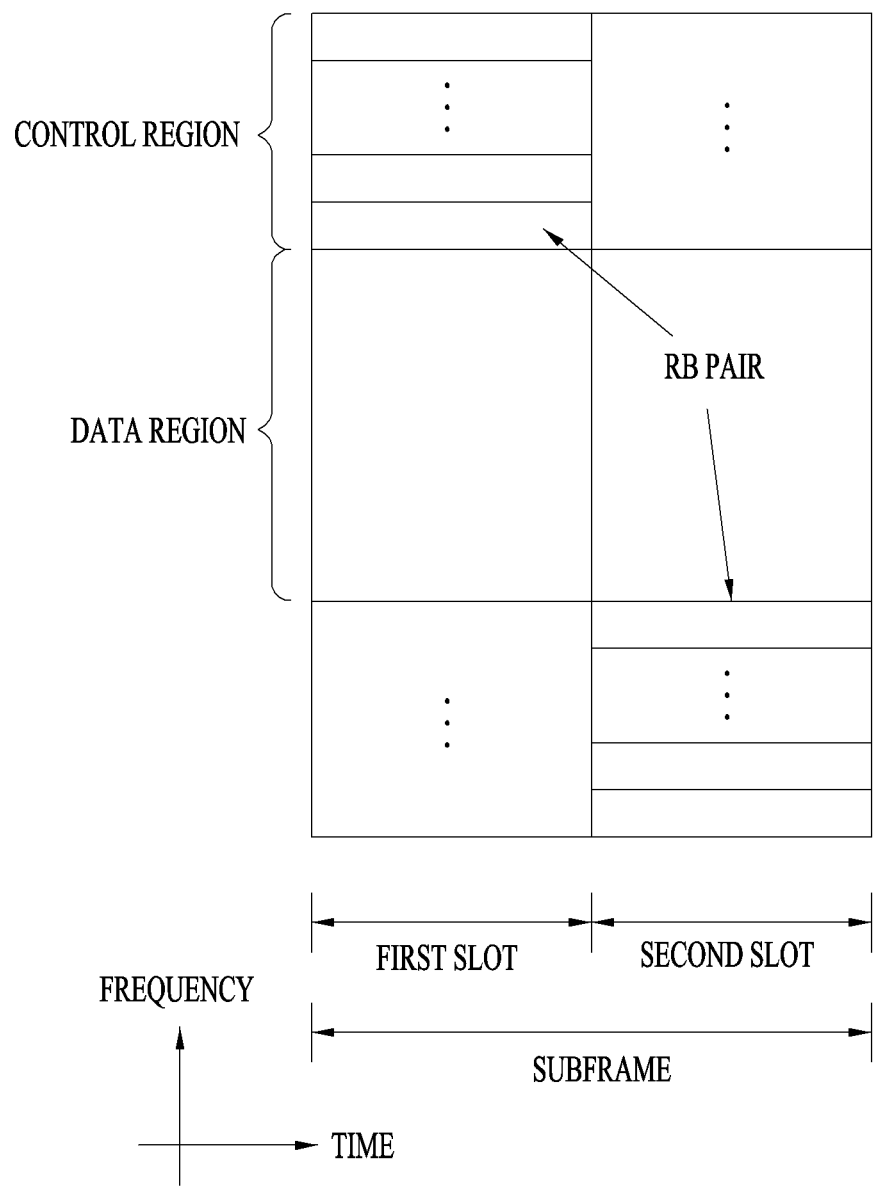
FIG. 4 illustrates a structure of an UpLink (UL) subframe, which may be used in embodiments of the present disclosure.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
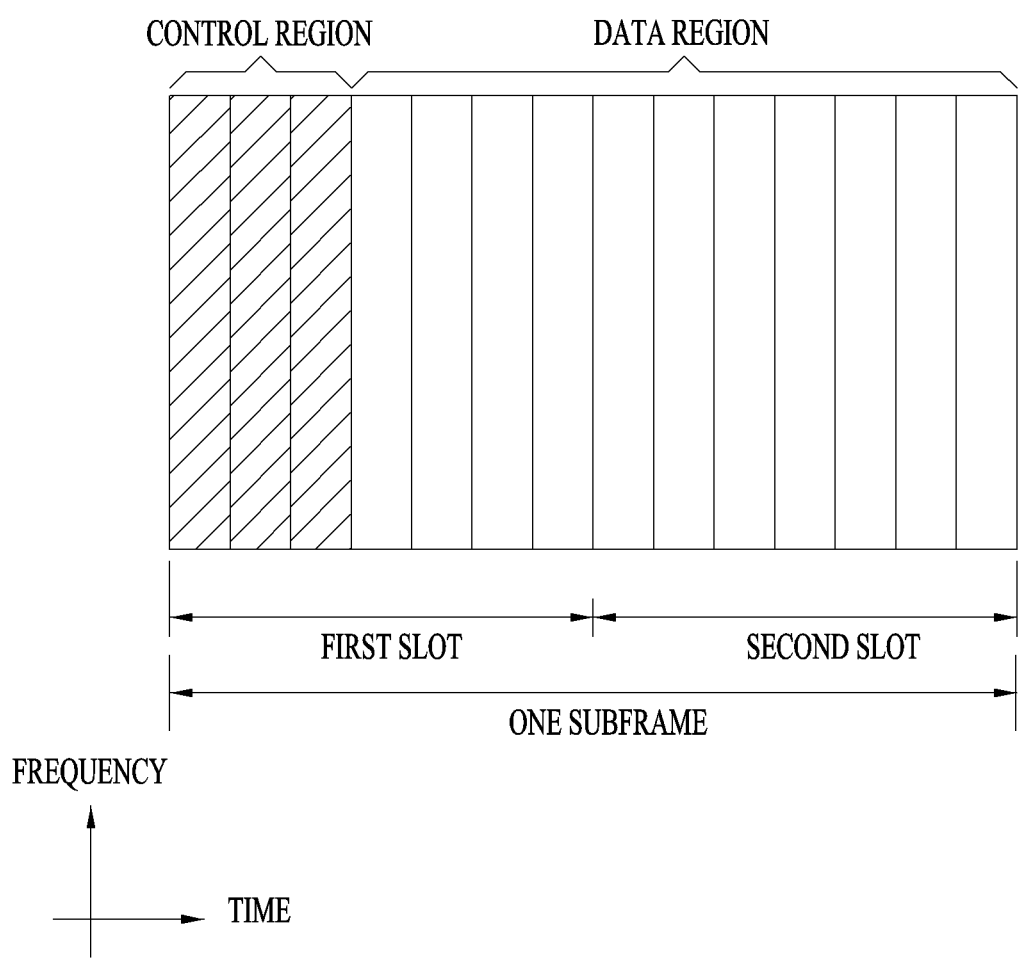
FIG. 5 illustrates a structure of a DL subframe, which may be used in embodiments of the present disclosure.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Carrier Aggregation (CA) Environment 1.2.1 CA Overview A 3GPP LTE system (conforming to Rel-8 or Rel-9) (hereinafter, referred to as an LTE system) uses Multi-Carrier Modulation (MCM) in which a single Component Carrier (CC) is divided into a plurality of bands.

In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

1.2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
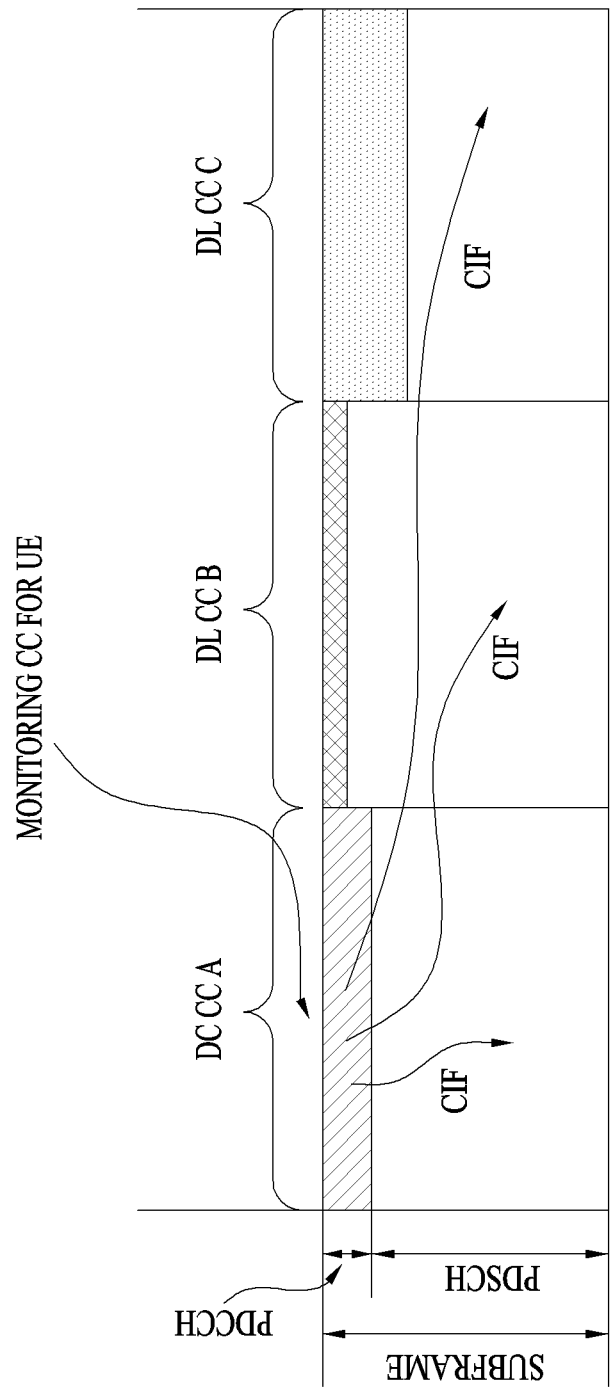
FIG. 6 illustrates a symbol configuration which may be used in embodiments of the present disclosure.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

1.3 Physical Downlink Control Channel (PDCCH)

1.3.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.3.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE} (=\lfloor N_{REG}/9 \rfloor)$ and the CCEs are indexed from 0 to $N_{CCE}-1$.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

Transmission mode 1: Single antenna transmission
Transmission mode 2: Transmission diversity
Transmission mode 3: Open-loop codebook based precoding when the number of layer is greater than 1, Transmission diversity when the number of rank is 1
Transmission mode 4: closed-loop codebook based precoding
Transmission mode 5: Multi-user MIMO of transmission mode 4 version
Transmission mode 6: closed-loop codebook based precoding which is specifically limited for signal layer transmission
Transmission mode 7: precoding dose not based on codebooks only supporting single layer transmission (release 8)
Transmission mode 8: precoding dose not based on codebooks supporting maximum 2 layers (release 9)
Transmission mode 9: precoding dose not based on codebooks supporting maximum 8 layers (release 10)
Transmission mode 10: precoding dose not based on codebooks supporting maximum 8 layers, for CoMP use (release 11)

1.3.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.4 Reference Signal (RS)

Hereinafter, reference signals are explained, which are used for the embodiments of the present invention.

Figure 7:
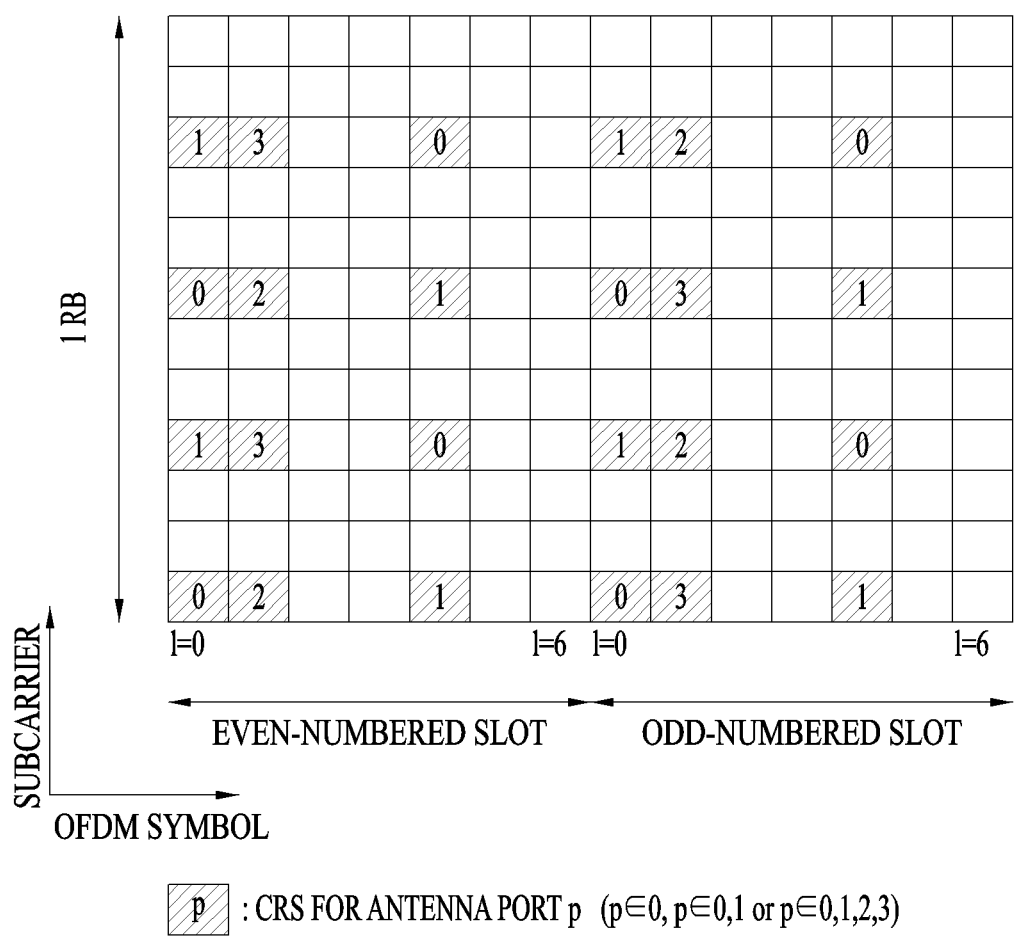
FIG. 7 illustrates a subframe to which cell specific reference signals (CRSs) are allocated, which may be used in embodiments of the present disclosure.

FIG. 7 illustrates a subframe to which cell specific reference signals (CRSs) are allocated, which may be used in embodiments of the present disclosure.

FIG. 7 represents an allocation structure of the CRS in case of the system supporting 4 antennas. Since CRSs are used for both demodulation and measurement, the CRSs are transmitted in all DL subframes in a cell supporting PDSCH transmission and are transmitted through all antenna ports configured at an eNB.

More specifically, CRS sequence is mapped to complex-modulation symbols used as reference symbols for antenna port p in slot $n_s$.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE.

When the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS.

Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

Figure 8:
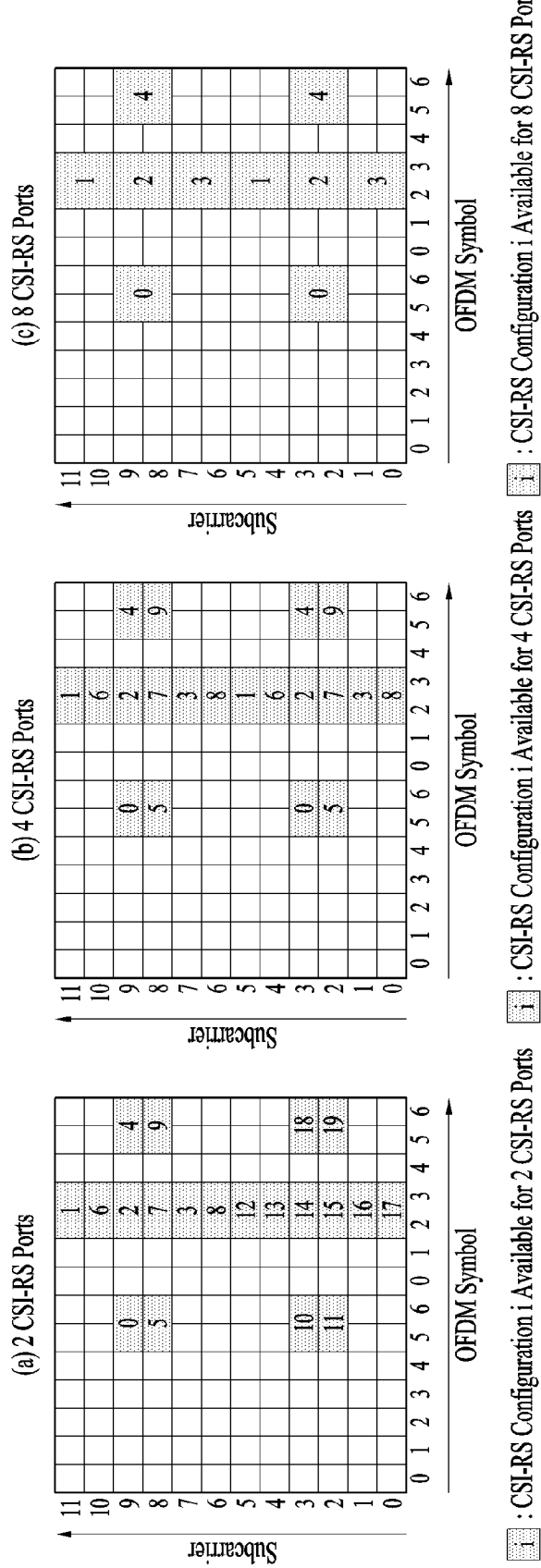
FIG. 8 illustrates an example of subframes to which channel state information reference signals (CSI-RSs) are allocated according to the number of antenna ports, which may be used in embodiments of the present disclosure.

FIG. 8 illustrates an example of subframes to which channel state information reference signals (CSI-RSs) are allocated according to the number of antenna ports, which may be used in embodiments of the present disclosure.

A CSI-RS is a DL RS that is introduced in a 3GPP LTE-A system for channel measurement rather than for demodulation. In the 3GPP LTE-A system, a plurality of CSI-RS configurations is defined for CSI-RS transmission. In subframes in which CSI-RS transmission is configured, CSI-RS sequence is mapped to complex modulation symbols used as RSs on antenna port p.

FIG. 8(a) illustrates 20 CSI-RS configurations 0 to 19 available for CSI-RS transmission through two CSI-RS ports among the CSI-RS configurations, FIG. 8(b) illustrates 10 available CSI-RS configurations 0 to 9 through four CSI-RS ports among the CSI-RS configurations, and FIG. 8(c) illustrates 5 available CSI-RS configurations 0 to 4 through 8 CSI-RS ports among the CSI-RS configurations.

The CSI-RS ports refer to antenna ports configured for CSI-RS transmission. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 6 or Table 7 but also with subframes in which CSI-RSs are configured.

Meanwhile, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations.

Hereinafter, in order to distinguish between a CSI-RS configuration to which (1) a CSI-RS configuration is assigned and (2) a CSI-RS configuration varying according to a CSI-RS configuration number, the number of CSI-RS ports, and/or a CSI-RS configured subframe, the CSI-RS configuration of the latter will be referred to as a CSI-RS resource configuration. The CSI-RS configuration of the former will be referred to as a CSI-RS configuration or CSI-RS pattern.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table 8 shows CSI-RS subframe configuration $I_{CSI-RS}$ according to TCSI-RS and ΔCSI-RS.

TABLE 8

| CSI-RS-SubframeConfig ICSI-RS | CSI-RS periodicity TCSI-RS (subframes) | CSI-RS subframe offset ΔCSI-RS (subframes) |
| --- | --- | --- |
| 0-4 | 5 | ICSI-RS |
| 5-14 | 10 | ICSI-RS-5 |
| 15-34 | 20 | ICSI-RS-15 |
| 35-74 | 40 | ICSI-RS-35 |
| 75-154 | 80 | ICSI-RS-75 |

Subframes satisfying the following Equation 1 are subframes including CSI-RSs.

$$(10n_f + \lfloor n_s/2 \rfloor - \Delta_{CSI-RS}) \bmod T_{CSI-RS} = 0 \quad \text{[Equation 1]}$$

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

Figure 9:
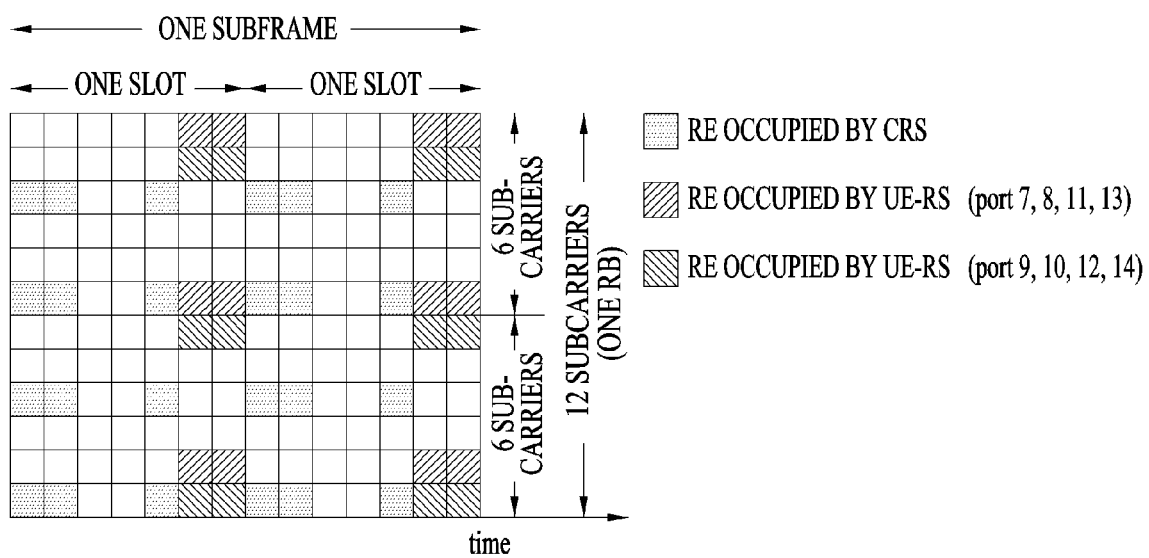
FIG. 9 illustrates an example of a subframe to which UE-specific Reference Signals (UE-RSs) are allocated, which may be used in embodiments of the present disclosure.

FIG. 9 illustrates an example of a subframe to which UE-specific Reference Signals (UE-RSs) are allocated, which may be used in embodiments of the present disclosure.

Referring to FIG. 9, the subframe illustrates REs occupied by UE-RSs among REs in one RB of a normal DL subframe having a normal CP.

UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 9, in a PRB having frequency-domain index $n_{PRB}$ assigned for PDSCH transmission with respect to p=7, p=8, or p=7, 8, . . . , υ+6, a part of UE-RS sequence r(m) is mapped to complex-valued modulation symbols $a_{k,l}^{(p)}$ in a subframe according to the following equation 10.

UE-RSs are transmitted through antenna ports) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a RB pair are the same with respect to a UE-RS port regardless of a UE or a cell.

As a result, the number of DMRS REs in an RB to which a PDSCH for a specific UE in a specific subframe is mapped is the same. Notably, in RBs to which the PDSCH for different UEs in the same subframe is allocated, the number of DMRS REs included in the RBs may differ according to the number of transmitted layers.

2. PQI and QCL Used in NCT 2.1 NCT Overview

In LTE Release 8/9/10/11 systems which are legacy systems, RSs and control channels such as a CRS, a Primary Synchronization Signal (PSS), a Secondary Synchronization Signal (SSS), a PDCCH, and a PBCH are transmitted in a DL CC.

However, in a future wireless access system, a DL CC in which all or some of the CRS, the PSS/SSS, the PDCCH, and the PBCH are not transmitted may be introduced in order to improve interference between a plurality of cells and improve carrier extension. In the embodiments of the present disclosure, this carrier is defined as an extension carrier or a New Carrier Type (NCT), for convenience.

The NCT described in the present disclosure may be a Scell in the case in which an eNB supports CA or may be a carrier provided by a neighboring eNB for cooperative data transmission in the case in which eNBs support CoMP. In addition, the NCT may be a small cell which is a cell synchronized with a reference cell (e.g. PCell). Particularly, in the embodiments of the present disclosure, the NCT may be called a second CC.

In the following embodiments, methods for performing DCI format 2D and QCL will be described in detail.

2.2 Quasi Co-Location (QCL)

Hereinafter, QCL between antenna ports will be described.

If antenna ports are Quasi-Co-Located (also called QCL), this means that "a UE may assume that large-scale properties of a signal received from one antenna port (or a radio channel corresponding to one antenna port) are equal in entirety or in part to large-scale properties of a signal received from another antenna port (or a radio channel corresponding to another antenna port)". The large-scale properties may include Doppler spread related to a frequency offset, Doppler shift, an average delay related to a timing offset, and a delay spread and may further include an average gain.

According to definition of QCL, the UE cannot assume that the large-scale properties of antenna ports not in a QCL relationship, i.e. large-scale properties of Non Quasi Co-Located (NQCL) antenna ports are equal. In this case, the UE should independently perform a tracking procedure to obtain the frequency offset, the timing offset, etc. according to an antenna port.

In contrast, the UE may advantageously perform following operations between QCL antenna ports.

1) The UE may identically apply a power-delay profile, delay spread, a Doppler spectrum, and Doppler spread estimation result, for a radio channel corresponding to a specific antenna port, to Wiener filter parameters, etc. which are used to estimate a radio channel corresponding to another antenna port.

2) The UE may acquire time synchronization and frequency synchronization for the specific antenna port and then apply the same synchronization to another antenna port.

3) The UE may calculate a Reference Signal Received Power (RSRP) measurement value of each QCL antenna port as an average with respect to average gain.

For example, when the UE receives scheduling information (e.g. DCI format 2C) about a DeModulation Reference Signal (DM-RS) based DL data channel via a PDCCH (or an E-PDCCH), it is assumed that the UE performs channel estimation for a PDSCH via a DM-RS sequence indicated by the scheduling information and then performs data demodulation.

In this case, if a DM-RS antenna port for DL data channel demodulation is QCL with a CRS antenna port of a serving cell, the UE may applying large-scale properties of a radio channel estimated from a CRS antenna port thereof without change upon channel estimation via the DM-RS antenna port, thereby improving reception performance of the DM-RS based DL data channel.

Similarly, if a DM-RS antenna port used for DL data channel demodulation is QCL with a CSI-RS antenna port of a serving cell, the UE may apply large-scale properties of a radio channel estimated from the CSI-RS antenna port of the serving cell without change upon channel estimation via the DM-RS antenna port, thereby improving reception performance of the DM-RS based DL data channel.

Meanwhile, an LTE system defines that an eNB sets one of QCL type A and QCL type B with respect to a UE via a higher layer signal upon transmitting a DL signal in transmission mode 10, which is a CoMP mode.

In QCL type A, it is assumed that antenna ports of a CRS, a DM-RS, and a CSI-RS are QCL with respect to large-scale properties except for average gain and the same node transmits physical channels and signals.

In contrast, in QCL type B, up to four QCL modes for each UE are set via a higher layer message so as to perform CoMP transmission such as Dynamic Point Selection (DPS) or Joint Transmission (JT) and a QCL mode to be used for DL signal reception among the four QCL modes is defined to be dynamically set through a PQI field of DCI.

DPS transmission in the case of QCL type B will now be described in more detail.

First, it is assumed that node #1 composed of N1 antenna ports transmits CSI-RS resource #1 and node #2 composed of N2 antenna ports transmits CSI-RS resource #2. In this case, CSI-RS resource #1 is included in QCL mode parameter set #1 and CSI-RS resource #2 is included in QCL mode parameter set #2. The eNB sets parameter set #1 and parameter set #2 via a higher layer signal with respect to a UE located within common coverage of node #1 and node #2.

Next, the eNB may perform DPS by setting parameter set #1 using DCI upon data (i.e. PDSCH) transmission to the UE via node #1 and setting parameter set #2 upon data transmission to the UE via node #2. If the UE may assume that CSI-RS resource #1 and a DM-RS are QCL upon receiving parameter set #1 via the DCI and that CSI-RS resource #2 and the DM-RS are QCL upon receiving parameter set #2.

2.2.1 DCI Format 2D

DCI format 2D has been newly defined to support DL transmission in an LTE-A Rel-11 system. In particular, DCI format 2D is defined to support CoMP between eNBs and is associated with transmission mode 10. That is, in order for a UE configured as transmission mode 10 for an allocated serving cell to decode a PDSCH according to a detected PDCCH/EPDCCH signal with DCI format 2D, up to 4 parameter sets may be configured through higher layer signaling. For a detailed description of each field included in DCI format 2D, reference may be made to section 5.3.3.1.5D of 3GPP TS 36.212 v11.3.

Table 5 shown below shows an exemplary PDSCH RE Mapping and Quasi-Co-Location Indicator (PQI) field included in DCI format 2D.

TABLE 5

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

Parameters shown in the following Table 6 are used to determine PDSCH RE mapping and PDSCH antenna port QCL. In Table 5, the PQI field indicates each parameter set configured via higher layer signaling.

TABLE 6

| Parameter | Description |
| --- | --- |
| crs-PortsCount-r11 | Number of CRS antenna ports for DPSCH RE mapping |
| crs-FreqShift-r11 | CRS frequency shift for PDSCH RE mapping |

TABLE 6-continued

| Parameter | Description |
| --- | --- |
| mbsfn-SubframeConfigList-r11 | MBSFN subframe configuration for PDSCH RE mapping |
| csi-RS-ConfigZPId-r11 | Zero-power CSI-RS resource configuration for PDSCH RE mapping |
| pdsch-Start-r11 | PDSCH starting position for PDSCH RE mapping |
| qcl-CSI-RS-ConfigNZPId-r11 | CSI-RS resource configuration identity for Quasi-Co-Location |

Referring to Table 6, parameter 'crs-PortsCount-r11' represents the number of CRS antenna ports for PDSCH RE mapping, parameter 'crs-FreqShift-r11' represents a CRS frequency shift value for PDSCH RE mapping, and parameter 'mbsfn-SubframeConfigList-r11' represents a Multimedia Broadcast over Single Frequency Network (MBSFN) subframe configuration for PDSCH RE mapping. In addition, parameter 'csi-RS-ConfigZPId-r11' represents a zero-power CSI-RS resource configuration for PDSCH RE mapping, parameter 'pdsch-Start-r11' represents a PDSCH start position for PDSCH RE mapping, and parameter 'qcl-CSI-RS-ConfigNZPId-r11' is used to identify a CSI-RS resource configuration for QCL.

In Table 5, parameter sets 1, 2, 3, and 4 are composed of a combination of the parameters shown in Table 6. Information about the combination of the parameters included in each parameter set is signaled to the UE by a higher layer.

2.3 Definition of New PQI Used in NCT

A legacy system supports transmission of a CRS, a PDCCH, etc., whereas a next system introduces an NCT in which transmission of the CRS, the PDCCH, etc. is not supported to raise data transmission efficiency. In the NCT, a new RS which is mapped to an RE corresponding to an antenna port of the CRS used in the legacy system but is not used for demodulation is defined. For example, since the new RS is used only for time/frequency tracking (i.e. time/frequency synchronization acquisition), the new RS will be referred to as a Tracking Reference Signal (TRS) in the embodiments of the present disclosure.

The TRS may be periodically transmitted in the NCT (e.g. at an interval of 5 ms). In an LTE Rel-11 system, Transmission Mode (TM) 10 is defined to support a CoMP operation. In this case, PQI information is included in DCI format 2D for PDSCH rate matching. The PQI information indicates 4 states using two bits (refer to section 1.4) and each state represents a combination of information configured by a higher layer.

In the NCT, not the CRS but the TRS is periodically transmitted on an RE corresponding to an antenna port of the CRS. Accordingly, the embodiments of the present disclosure provide a method for newly configuring and interpreting the PQI information used in the NCT. Particularly, the PQI information may be reconfigured as an abbreviated type suitable for the NCT.

2.3.1 Parameter Reconfiguration for 'crs-PortsCount-r11'

In Table 6, parameter 'crs-PortsCount-r11' indicating the number of CRS antenna ports for PDSCH RE mapping may be newly defined by the following methods.

(1) Method 1

Parameter 'crs-PortsCount-r11' may be set to '0' or a reserved value. Therefore, an eNB does not transmit PDSCH data on an RE on which the TRS is transmitted. That is, a UE does not infer the number of CRS antenna ports from the PQI information.

(2) Method 2

Parameter 'crs-PortsCount-r11' may be set to the number of TRS antenna ports. For example, the number of TRS antenna ports may be set to 1. That is, in the NCT, the UE assumes the number of CRS antenna ports for PDSCH RE mapping as the number of TRS antenna ports.

2.3.2 Parameter Reconfiguration for 'crs-FreqShift-r11'

In Table 6, parameter 'crs-FreqShift-r11' indicating a CRS frequency shift value for PDSCH RE mapping may be newly configured as follows.

(1) Method 1

Parameter 'crs-FreqShift-r11' may be set to a reserved value. Then, the eNB may explicitly inform the UE of a TRS frequency shift value used in the NCT or the UE may obtain the TRS frequency shift value through a PSS/SSS. Namely, the UE does not infer the CRS frequency shift value from the PQI information.

(2) Method 2

Parameter 'crs-FreqShift-r11' may be set to the TRS frequency shift value. Then, the UE may assume the CRS frequency shift value for PDSCH RE mapping, indicated by parameter 'crs-FreqShift-r11', as the TRS frequency shift value.

2.3.3 Parameter Reconfiguration for 'mbsfn-SubframeConfigList-r11'

In Table 6, parameter 'mbsfn-SubframeConfigList-r11' indicating an MBSFN subframe configuration for PDSCH RE mapping may be newly configured as follows.

(1) Method 1

Parameter 'mbsfn-SubframeConfigList-r11' may be set to a reserved value. In this case, the UE may assume that the TRS is not transmitted in a subframe set to an MBSFN subframe. If the TRS is configured not to be transmitted in a subframe set to an MBSFN subframe, the UE may assume that a PDSCH is not transmitted on an RE corresponding to a TRS antenna port or an RE on which the TRS is transmitted.

(2) Method 2

The eNB may inform the UE of an MBSFN subframe used in the NCT using parameter 'mbsfn-SubframeConfigList-r11'. If the TRS is configured to be transmitted in a subframe set to the MBSFN subframe, the UE may decode the TRS on the first and second OFDM symbols of the subframe and assume that the TRS is not transmitted on the other OFDM symbols of the subframe. Accordingly, resources for an RS may not be wasted on the other OFDM symbols.

As another method, the UE assumes that a PDSCH is not transmitted on an RE corresponding to a TRS antenna port or an RE on which the TRS is transmitted in the MBSFN subframe. In addition, if the TRS is configured not to be transmitted in a subframe set to the MBSFN subframe, the UE assumes that the PDSCH is transmitted on the RE corresponding to the TRS antenna port or the RE on which the TRS is transmitted.

The methods described in sections 2.3.1 to 2.3.3 may be used in combination. For example, all of parameters 'crs-PortsCount-r11', 'crs-FreqShift-r11', and 'mbsfn-SubframeConfigList-r11' may be set to reserved values in the NCT. In this case, the UE may not receive the CRS in the NCT and may perform time/frequency tracking using only the TRS. Alternatively, all or some of the above parameters may be configured as Method 2.

2.3.4 Tracking Method Using New PQI Information

Figure 10:
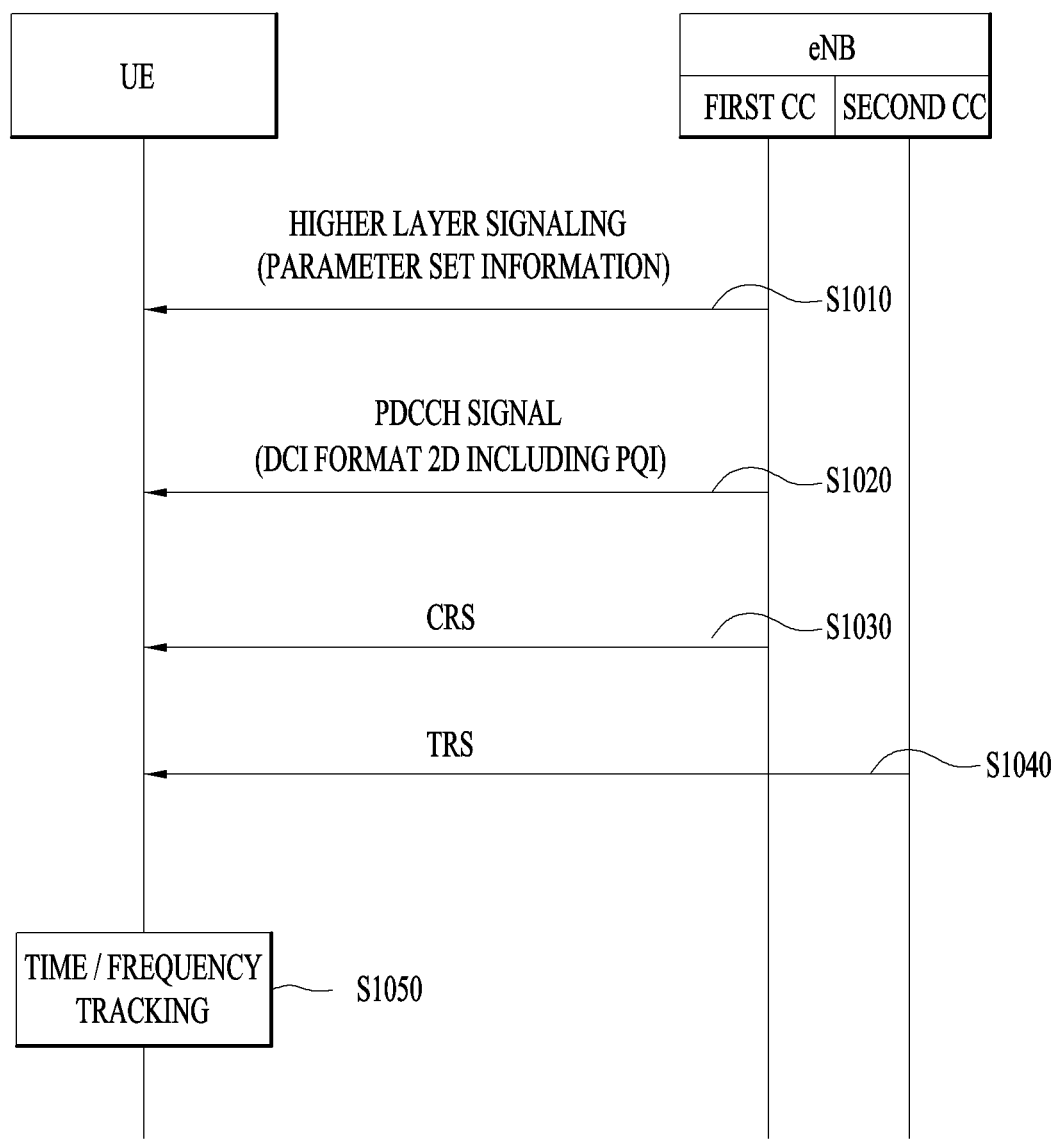
FIG. 10 illustrates one of tracking methods using new PQI information.

FIG. 10 is a diagram illustrating one of tracking methods using new PQI information.

In FIG. 10, a UE may perform time and/or frequency tracking in an NCT using the parameters described in sections 2.3.1 to 2.3.3. In FIG. 10, an eNB manages a first CC and a second CC. The first CC may be a PCell or an SCell as a legacy CC and the second CC may be a PCell or an SCell as the NCT. If the second CC is a CC of an eNB different from an eNB managing the first CC, a CoMP environment is assumed. The first CC may be connected to the second CC via an ideal backhaul. The first CC and the second CC refer to carriers scheduled by the eNB for managing and controlling the first CC and the second CC. However, description will be given below under the assumption that the UE communicates with the first CC and/or the second CC.

The UE receives parameter set information from the first CC via higher layer signaling. The parameter set information indicates which parameters constitute a parameter set indicated by PQI (Pdsch re mapping and Qcl Indicator) information. That is, the parameter set may include parameters which are configured by the methods described in sections 2.3.1 to 2.3.3 (refer to section 2.2.1) (S1010).

The UE receives a PDCCH signal configured with DCI format 2D from the first CC. DCI format 2D may include PQI information. The PQI information indicates one of parameter sets received in step S1010 (S1020).

The UE receives a PDSCH signal together with a CRS through the first CC. For example, if the first CC (e.g. legacy CC) and the second CC (e.g. NCT) perform a CoMP operation, a QCL relationship between a CSI-RS and the CRS is defined in the first CC and the CRS may be used for frequency tracking. That is, the CRS is QCL with a CSI-RS antenna port so that the UE may receive the PDSCH signal based on the CRS by applying large-scale properties of a radio channel estimated from the CSI-RS antenna port. Therefore, the UE may perform time/frequency tracking using the CRS and perform channel estimation (S1030).

If the UE receives the PDSCH signal through the second CC, i.e. through the NCT, the UE receives the PDSCH signal together with the TRS. In this case, since the CRS is not used in the NCT, the UE may use the TRS for frequency tracking by defining a QCL relationship between the CSI-RS and the TRS. Accordingly, the TRS is not used to demodulate the PDSCH signal and is used only for time/frequency tracking with the second CC (S1040).

2.4 QCL-1 for Supporting CoMP

In the case of a CoMP operation, Transmission Points (TPs) may be selected in units of subframes through a PDCCH/EPDCCH. Therefore, in order to maintain frequency tracking (i.e. frequency synchronization) of TPs participating in CoMP, a UE may use CRSs transmitted by the TPs. To this end, the UE uses the CRSs through QCL information of antenna ports transmitted by the TPs. As described previously, the UE may operate as type A or type B according to QCL for antenna ports of a CRS, a CSI-RS, or a UE-specific RS (refer to section 2.2).

However, since a TRS is used in an NCT instead of a CRS for time/frequency tracking, it is necessary to define a new QCL type of the UE according to use of the TRS. In addition, according to LTE-A Rel-11 standards, the UE configured as TM 10 and QCL type B may perform frequency tracking using the CRS. Therefore, the UE may perform frequency tracking using the TRS instead of the CRS in the NCT. That is, type A and type B in the NCT may be redefined as indicated in Table 7.

TABLE 7

| Type | Description |
| --- | --- |
| New type A | A UE assumes that antenna port x for a TRS and antenna ports 7 to 22 of a serving cell are QCL with respect to delay spread, Doppler spread, Doppler shift, and average delay. |
| New type B | A UE configured as QCL type B and TM 10 assumes that an TRS antenna port (e.g. antenna port x) associated with parameter qcl-CRS-info-R11 corresponding to CSI-RS resource configuration and antenna ports 15 to 22 corresponding to CSI-RS configuration are QCL with respect to Doppler shift and Doppler spread. |

Parameter gel-CRS-info-r11 is a higher layer parameter including TRS information. Parameter gel-CRS-info-r11 is used to indicate CRS antenna ports which are QCL with CSI-RS antenna ports. Notably, if a legacy carrier and an NCT are configured to transmit a PDSCH through inter-cell coordination (i.e. the legacy carrier and the NCT perform a CoMP operation), the UE configured as TM 10 should assume that a CSI-RS with which an antenna port is QCL in the case in which the PDSCH is transmitted in the legacy carrier is different from a CSI-RS with which the antenna port is QCL in the case in which the PDSCH is transmitted in the NCT.

For example, upon receiving the PDSCH in the legacy carrier, the UE may assume that the CRS and the CSI-RS are QCL and upon receiving the PDSCH in the NCT, the UE may assume that the TRS and the CSI-RS are QCL. Namely, parameter qcl-CRS-info-r11 may be used to indicate TRS antenna ports with which CSI-RS antenna ports are QCL.

In other words, the UE configured as new type A may assume that a TRS antenna port is QCL with a CSI-RS or a UE specific RS (e.g. DM-RS). In addition, the UE configured as new type B may assume that the TRS antenna port is QCL with the CSI-RS.

Accordingly, the UE configured as TM 10 and new type B can improve reception performance of a TRS based DL data channel by applying large-scale properties obtained through the CSI-RS in the NCT upon receiving the TRS. In addition, the UE may perform frequency tracking in the NCT based on the CSI-RS and the TRS.

2.5 QCL-2 for Supporting CoMP

In the case of an NCT having a narrow system bandwidth, the UE may not obtain satisfactory performance upon frequency tracking using the TRS. In the case of a broad system bandwidth, since relatively more REs are used than REs in the case of a narrow system bandwidth, the number of REs allocated to the TRS increases and thus tracking performance is improved. However, when system bandwidth is narrow, since relatively few REs are used, the number of REs allocated to the TRS decreases and thus satisfactory performance cannot be acquired.

Therefore, the antenna port QCL operation of the TRS and the CSI-RS in section 2.4 may be applied to the broadest system bandwidth. For instance, an LTE/LTE-A system supports system bandwidths of 6 RBs, 15 RBs, 25 RBs, 50 RBs, and 100 RBs and QCL between antenna ports of the TRS and the CSI-RS described in section 2.4 may be assumed only in a wireless access system supporting bandwidths of 15 RBs, 25 RBs, 50 RBs, and 100 RBs except for a wireless access system supporting a bandwidth of 6 RBs.

In other words, the invention of section 2.4 may be generally applied only to a wireless access system satisfying system bandwidth ≥X RBs (where X is an element belonging to {6, 15, 25, 50, 100}).

2.6 QCL-3 for Supporting CoMP

As another method, the UE may attempt to perform frequency tracking using the TRS even in the NCT having a narrow system bandwidth. In this case, the UE may assume that a CRS or a TRS of a reference carrier and a CSI-RS of the NCT are QCL. A network may inform the UE of the reference carrier via higher layer signaling, physical layer (L1) signaling, or MAC layer (L2) signaling. In the embodiments of the present disclosure, the reference carrier may be referred to as a primary carrier, a PCell, an SCell, or an anchor carrier.

It is assumed that the system bandwidth of the reference carrier has a system bandwidth to a degree capable of performing satisfactory time/frequency tracking using the CRS or the TRS. For example, it is assumed that a system bandwidth is above 25 RBs.

QCL with a CSI-RS antenna port may be defined as indicated in Table 8.

TABLE 8

| QCL target RS | Description |
|---|---|
| CRS of reference carrier | A UE configured as QCL type B and TM 10 may assume that antenna ports 0 to 3 of a reference carrier associated with qcl-referenceCRS-info-r11 corresponding to CSI-RS resource configuration and antenna ports 15 to 22 corresponding to CSI-RS resource configuration are QCL with respect to Doppler shift and Doppler spread. |
| TRS of reference carrier | A UE configured as QCL type B and TM 10 may assume that TRS antenna ports (e.g. antenna port x) associated with qcl-referenceCRS-info-r11 corresponding to CSI-RS resource configuration and antenna ports 15 to 22 corresponding to CSI-RS resource configuration are QCL with respect to Doppler shift and Doppler spread. |

In Table 8, parameter qcl-referenceCRS-info-r11 is a parameter including CRS information or TRS information of the reference carrier.

Figure 11:
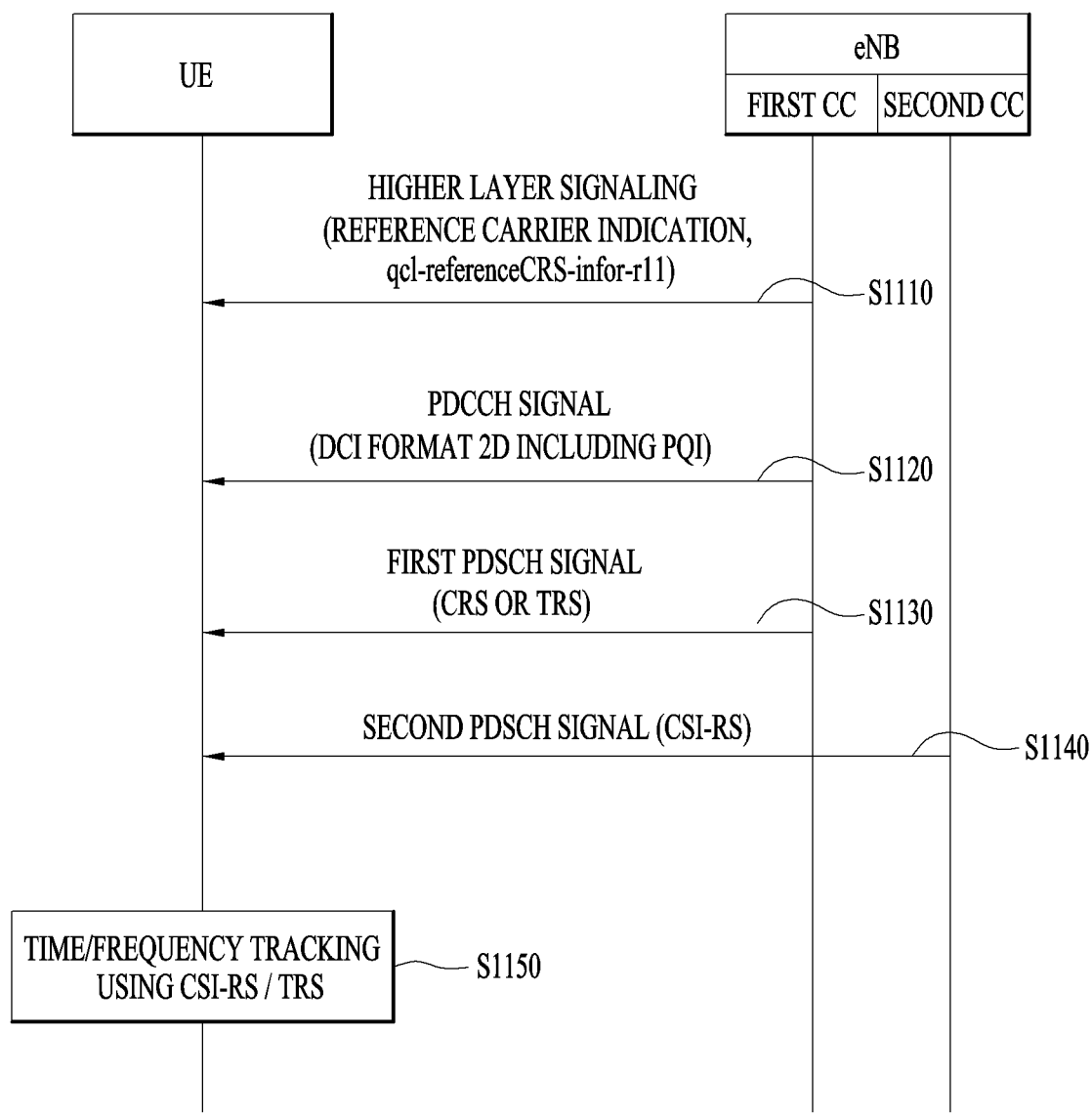
FIG. 11 illustrates one of tracking methods performed in a CoMP environment.

FIG. 11 is a diagram illustrating one of tracking methods performed in a CoMP environment.

In FIG. 11, an eNB manages a first CC and a second CC. The first CC may be a PCell or an SCell as a legacy CC and the second CC may be a PCell or an SCell as an NCT. However, even in the NCT, control information such as an E-PDCCH may be transmitted. The first CC and the second CC may be managed by the same eNB (or TP) or by different eNBs. If the second CC is a CC of an eNB different from an eNB managing the first CC, a CoMP environment is assumed. The first CC may be connected to the second CC via an ideal backhaul. The first CC and the second CC refer to carriers scheduled by an eNB for managing and controlling the first CC and the second CC. However, description will be given under the assumption that the UE communicates with the first CC and/or the second CC. It is assumed that the operation of FIG. 11 is performed based on the description given in section 2.6.

In FIG. 11, the UE is configured as TM 10 and QCL type B. In this case, the UE may receive higher layer signaling including a QCL reference CRS information (qcl-referenceCRS-info-r11) parameter indicating CRS information of a reference carrier from the first CC (S1110).

In step S1110, higher layer signaling may further include a reference carrier indication parameter indicating a reference carrier among cells (or carriers) managed by the eNB. Therefore, the UE may confirm which carrier is the reference carrier from the reference carrier indication parameter. It is assumed in FIG. 11 that the first CC is the reference carrier.

The UE may receive a PDCCH signal configured with DCI format 2D from the first CC. DCI format 2D may include PQI information indicating a parameter set for QCL configured for the UE (refer to section 2.2.1) (S1120).

When steps S1110 and S1120 are performed, the UE may be aware of QCL properties to be performed in a CoMP environment.

The UE may receive a first PDSCH including a CRS from the first CC. The CRS is QCL with a CSI-RS of the first CC (S1130).

The UE may also receive a second PDSCH signal including a CSI-RS from the second CC. In this case, the CSI-RS of the second CC is QCL with the CRS of the first CC (S1140).

Accordingly, the UE receives an RS of the second CC by applying large-scale properties obtained from the CSI-RS of the first CC, thereby improving reception performance of a DL data channel. The RS of the second CC may be a CSI-RS, a DM-RS, or a TRS.

Next, the UE may perform time/frequency tracking between the first CC and the second CC using a QCL CSI-RS received from the second CC (S1150).

In another embodiment of the present disclosure, the UE may receive parameter qcl-referenceCRS-info-r11 indicating TRS information of a reference carrier through a higher layer signal in step S1110. Namely, a QCL target in Table 8 may be the TRS of the reference carrier.

In this case, the reference carrier is the NCT as well. Therefore, the UE may receive a first PDSCH signal including the TRS from the eNB in step S1130 and the TRS is QCL with the CSI-RS of the first CC.

In step S1140, the UE may receive a second PDSCH including the RS of the second CC from the second CC. The RS of the second CC is QCL with the TRS of the first CC. Therefore, the UE may receive the TRS of the first CC and the RS of the second CC by applying large-scale properties obtained from the CSI-RS of the first CC, thereby improving reception performance of a DL data channel. The RS of the second CC may be a CSI-RS, a DM-RS, or a TRS.

2.7 Synchronization Reference Carrier

A carrier which does not transmit a PSS/SSS/TRS associated with synchronization among NCTs is called a synchronized NCT. The eNB should designate a synchronization reference carrier to be referred to by the synchronized NCT for time/frequency synchronization. In other words, the synchronized NCT acquires or maintains time/frequency synchronization using a PSS/SSS/CRS or a TRS of the synchronization reference carrier.

In the synchronized NCT, the UE configured as TM 10 may use a CRS or a TRS of the synchronization reference carrier for time/frequency tracking. Then, the behavior of the UE is as follows.

(1) Case in which Synchronization Reference Carrier is NCT

QCL type A: The UE assumes that antenna port x of a TRS of a synchronization reference carrier of a serving cell and antenna ports 7 to 22 of the serving cell are QCL with respect to delay spread, Doppler spread, Doppler shift, and average delay.

(2) Case in which Synchronization Reference Carrier is not NCT

QCL type A: The UE assumes that antenna ports 0 to 3 corresponding to a CRS of a synchronization reference carrier of a serving cell and antenna ports 7 to 22 of the serving cell are QCL with respect to delay spread, Doppler spread, Doppler shift, and average delay.

In the case of TM 9 in the NCT, the UE may not assume that a TRS antenna port, CSI-RS antenna ports 15 to 22, and UE specific RS (e.g., DM-RS) antenna ports 7 to 14 are QCL.

Configuration of a synchronized NCT may be determined according to a system bandwidth. For example, if a system bandwidth is above y RBs, the synchronized NCT may be configured. Alternatively, the synchronized NCT may be configured in the NCT of y RBs or less. For example, in the case of a narrow band, since synchronization performance of the TRS is not good, the UE may perform tracking using the synchronization reference carrier. Accordingly, less than y RBs are desirably configured as the synchronized NCT.

If a TRS has no definition for an antenna port such as a PSS/SSS, the following QCL between antennas may be defined in order for the UE to receive help for time/frequency tracking using the TRS.

(1) Method 1: The UE configured as TM 10 in the NCT assumes that the TRS and UE specific RS antenna ports (e.g., antenna ports 7 to 14) are QCL.

(2) Method 2: The UE configured as TM 10 in the NCT assumes that a TRS associated with one CSI-RS resource and CSI-RS antenna ports (e.g. antenna ports 15 to 22) are QCL.

4. Apparatus

Figure 12:
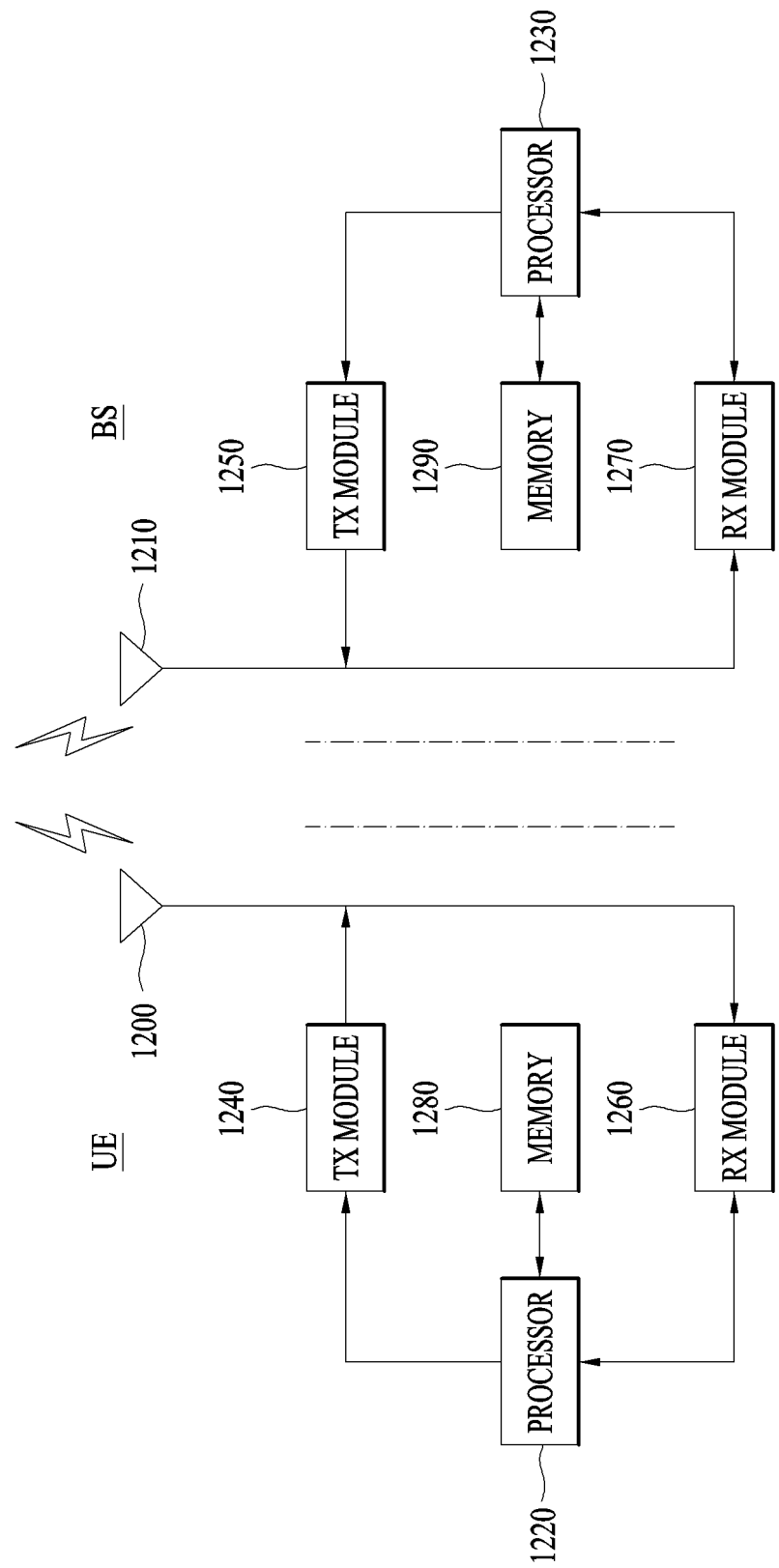
FIG. 12 illustrates means that can implement the methods described with reference to FIGS. 1 to 11.

Apparatuses illustrated in FIG. 12 are means that can implement the methods described before with reference to FIGS. 1 to 11.

A UE may act as a transmitter on a UL and as a receiver on a DL. An eNB may act as a receiver on a UL and as a transmitter on a DL.

That is, each of the UE and the eNB may include a Transmission (Tx) module 1240 or 1250 and a Reception (Rx) module 1260 or 1270, for controlling transmission and reception of information, data, and/or messages, and an antenna 1200 or 1210 for transmitting and receiving information, data, and/or messages.

Each of the UE and the eNB may further include a processor 1220 or 1230 for implementing the afore-described embodiments of the present disclosure and a memory 1280 or 1290 for temporarily or permanently storing operations of the processor 1220 or 1230.

The embodiments of the present disclosure may be performed using the components and functions of the UE and the eNB. For example, the processor of the UE may receive a first RS and a second RS through the reception module. The UE may obtain first CQI information using the first RS and second CQI information using the second RS. The UE may report the first CQI information and the second CQI information to the eNB through a PUCCH/PUSCH. For a detailed description, reference has been made to sections 1 to 3.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 12 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1280 or 1290 and executed by the processor 1220 or 1230. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for performing Quasi Co-Location (QCL) for a second carrier by a User Equipment (UE) in a wireless access system, the method comprising:
receiving a higher layer signal including a reference carrier indication indicating a reference carrier and a QCL reference Cell specific Reference Signal (CRS) information parameter indicating tracking reference signal (TRS) information of the reference carrier;
receiving a Physical Downlink Control Channel (PDCCH) signal including a Physical Downlink Shared Channel (PDSCH) Resource Element (RE) Mapping and QCL Indicator (PQI) field, the PQI field indicating a QCL parameter set configured for the UE;

receiving from the reference carrier a first PDSCH including a TRS, based on the TRS information indicated by the QCL reference CRS information parameter and the QCL parameter set indicated by the PQI field, wherein the TRS is quasi co-located with a CSI reference signal (CSI-RS) of the reference carrier according to a CSI-RS resource configuration;

receiving from the second carrier a second PDSCH, including a corresponding CSI-RS, by applying large-scale properties obtained from the CSI-RS of the reference carrier, wherein the CSI-RS from the second carrier is quasi co-located with the TRS of the reference carrier; and performing time and frequency tracking between the reference carrier and the second carrier based on the CSI-RS received from the second carrier, wherein the TRS is used only for the time and frequency tracking, and the TRS is periodically transmitted in the reference carrier.

2. The method according to claim 1,
wherein the UE is configured as a transmission mode 10 and a QCL type B, and
wherein the QCL type B indicates that an antenna port for the TRS and an antenna port corresponding to the CSI-RS resource configuration are quasi co-located.

3. The method according to claim 1,
wherein the UE is configured as a transmission mode 10 and a QCL type B such that the UE assumes that an antenna port for the TRS and an antenna port corresponding to the CSI-RS resource configuration are quasi co-located with respect to a Doppler shift and a Doppler spread.

4. The method according to claim 1,
wherein the reference carrier is a Primary cell (Pcell), and
wherein the second carrier is a New Carrier Type (NCT) including only a data channel.

5. An apparatus supporting performing Quasi Co-Location (QCL) for a second carrier in a wireless access system, the apparatus comprising:
a receiver; and
a processor for supporting QCL, wherein the processor is configured to
control the receiver to receive a higher layer signal including a reference carrier indication indicating a reference carrier and a QCL reference Cell specific Reference Signal (CRS) information parameter indicating tracking reference signal (TRS) information of the reference carrier, control the receiver to receive a Physical Downlink Control Channel (PDCCH) signal including a Physical Downlink Shared Channel (PDSCH) Resource Element (RE) Mapping and QCL Indicator (PQI) field through the receiver, the PQI field indicating a QCL parameter set configured for the UE, control the receiver to receive from the reference carrier a first PDSCH including a TRS, based on the TRS information indicated by the QCL reference CRS information parameter and the QCL parameter set indicated by the PQI field, wherein the TRS is quasi co-located with a CSI reference signal (CSI-RS) of the reference carrier, control the receiver to receive from the second carrier a second PDSCH, including a CSI-RS, by applying large-scale properties obtained from the CSI-RS of the reference carrier, wherein the CSI-RS from the second carrier is quasi co-located with the TRS of the reference carrier, and perform frequency tracking between the reference carrier and the second carrier based on the CSI-RS received from the second carrier, wherein the TRS is used only for time and frequency tracking, and the TRS is periodically transmitted in the reference carrier.

6. The apparatus according to claim 5,
wherein the apparatus is configured as transmission a mode 10 and a QCL type B, and
wherein the QCL type B indicates that an antenna port for the TRS and an antenna port corresponding to the CSI-RS resource configuration are quasi co-located.

7. The apparatus according to claim 5,
wherein the apparatus is configured as a transmission mode 10 and a QCL type B such that the UE assumes that an antenna port for the TRS and an antenna port corresponding to the CSI-RS resource configuration are quasi co-located with respect to a Doppler shift and a Doppler spread.

8. The apparatus according to claim 5,
wherein the reference carrier is a Primary cell (Pcell), and
wherein the second carrier is a New Carrier Type (NCT) including only a data channel.

* * * * *